(12) United States Patent
Hellwig et al.

(10) Patent No.: US 6,295,302 B1
(45) Date of Patent: Sep. 25, 2001

(54) ALTERNATING SPEECH AND DATA TRANSMISSION IN DIGITAL COMMUNICATIONS SYSTEMS

(75) Inventors: Karl Hellwig, Wonfurt (DE); Anders Danne, Kista (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 0 days.

(21) Appl. No.: 09/065,931

(22) Filed: Apr. 24, 1998

(51) Int. Cl.$^7$ .......................................... H04J 3/00
(52) U.S. Cl. .................... 370/522; 370/345; 371/37.01
(58) Field of Search .................... 370/321, 328, 370/336, 493, 498, 522, 904, 345; 371/37.01

(56) References Cited

U.S. PATENT DOCUMENTS

| | | |
|---|---|---|
| 4,813,040 | 3/1989 | Futato . |
| 4,864,561 | 9/1989 | Ashenfelter et al. . |
| 5,121,385 | 6/1992 | Tominaga et al. . |
| 5,533,019 | 7/1996 | Jayapalan . |
| 6,108,560 * | 8/2000 | Navaro .................................. 455/517 |
| 6,125,120 * | 9/2000 | Lehtimaki ............................. 370/435 |
| 6,134,242 * | 10/2000 | Aftelak .................................. 370/465 |
| 6,144,658 * | 11/2000 | Lebizay et al. ....................... 370/352 |
| 6,167,040 * | 12/2000 | Haeggstrom .......................... 370/352 |
| 6,172,974 * | 1/2001 | Tseng et al. .......................... 370/328 |

FOREIGN PATENT DOCUMENTS

| | | | |
|---|---|---|---|
| 0243563 | 11/1987 | (EP) | ............................ H04M/11/06 |
| 0713343 | 5/1996 | (EP) | ............................... H04Q/7/32 |
| 9426056 | 11/1994 | (WO) | ............................ H04M/11/00 |
| 9526603 | 10/1995 | (WO) | ............................... H04M/1/00 |
| 9613916 | 5/1996 | (WO) | ................................ H04J/3/17 |

OTHER PUBLICATIONS

Jerry Skene: "UFO? No, TFO" Coherent Communications—Article, Jan. 1998, www.coherent.com/articles/tfo.htm.

GSM 04.53 "Digital cellular telecommunications system (Phase 2+); Inband Tandem Free Operation (TFO) of Speech Codecs; Service Description; Stage 3." European Telecommunications Standards Institute. Draft Version 0.1.3 (Oct. 1997).

H.221 "Transmission of Non–Telephone Signals: Frame Structure for a 64 to 1920 kbits/s Channel on Audiovisual Teleservices." International Telecommunications Union(ITU–T) (Jul. 1995).

* cited by examiner

Primary Examiner—Hassan Kizuo
Assistant Examiner—Ahmed Elallam
(74) Attorney, Agent, or Firm—Jenkens & Gilchrist, P.C.

(57) ABSTRACT

Alternate speech and data communication over a single circuit is implemented within a communication network which include first nodes which include both a data source and a speech source. Digital information, comprising either speech parameters or data, is sent in discrete blocks between the first node and a second node connected to the network. An inband signaling bit pattern is included within selected blocks sent by a TX-alternator in the sending node to indicate whether all following digital information is to be interpreted by the receiving node as speech or data and a RX-alternator in the receiving node interprets the digital information in accordance with the last received inband signaling pattern. One exemplary implementation is in a GSM cellular radio network in tandem free operation.

52 Claims, 5 Drawing Sheets

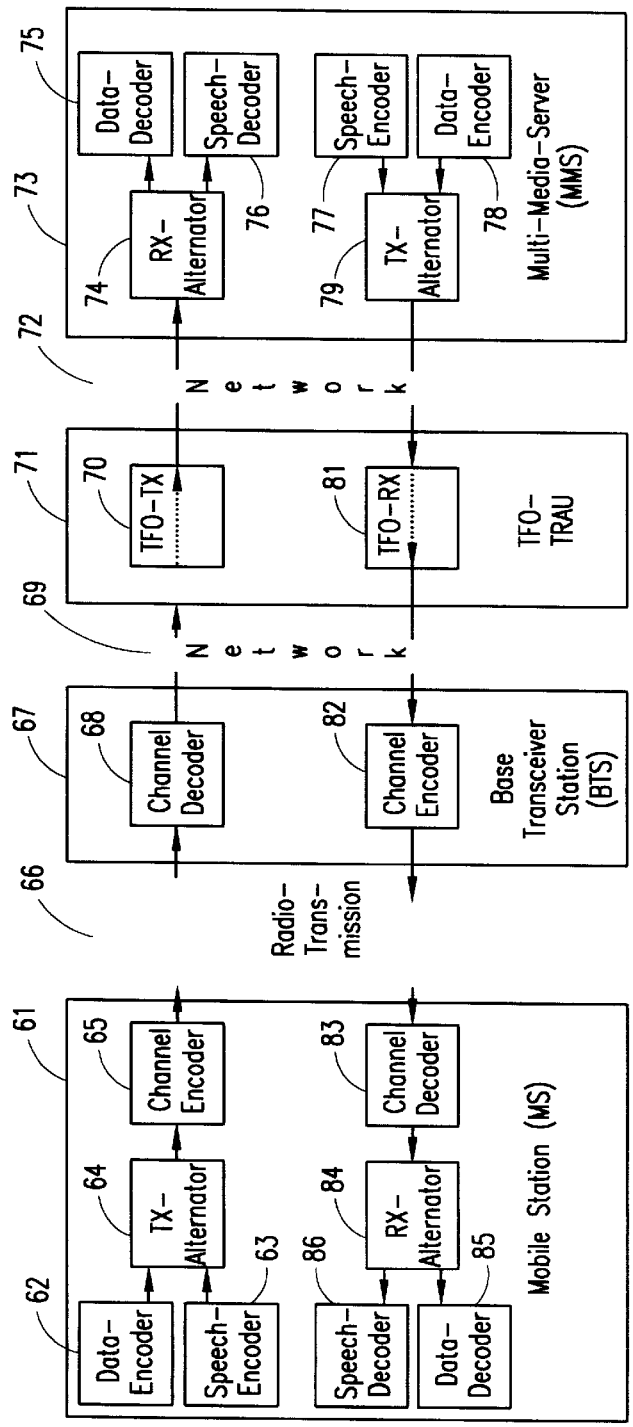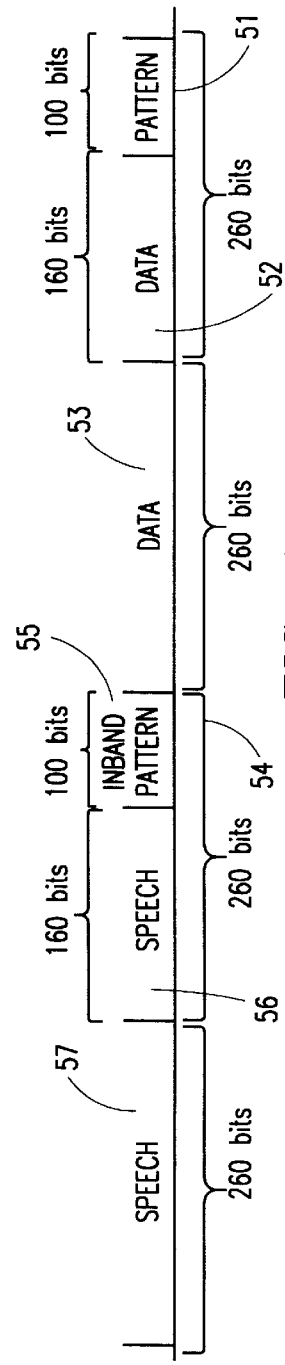

ALTERNATING SPEECH AND DATA TRANSMISSION IN DIGITAL COMMUNICATIONS SYSTEMS

BACKGROUND OF THE INVENTION

1. Field of the Invention

The invention relates to digital communications networks such as the Integrated Services Digital Network (ISDN) and digital radio systems and, more particularly, to the alternate transmission of speech and data communications in such networks and systems.

2. Description of the Related Art

The related art described herein consists of that related primarily to radio communication because it is in that field that the majority of work has been done regarding the alternating transmission of speech and data. However, the present invention is equally applicable to any terminals which have an associated coder or decoder that may be selectively bypassed under control of the system of the present invention.

Traditionally, both wireline and radio communication networks have been used for the transmission of speech information from one point in the network to another. Recent advances in computer and communications technologies indicate that the dominant use of both radio and wireline communication networks in the future may be for data communications, not voice. The recent proliferation of so-called "multimedia" applications and services frequently calls for the combined usage of both speech and data in a single user application. The implementation of such applications within the mobile radio network requires that subscribers be able to transmit both speech and data either simultaneously or alternately.

The increasing demand for such multimedia services within digital cellular radio systems requires fast and flexible transmission of both speech and data within the network. While many of these potential applications do not require a full simultaneous transmission of speech and data at the same time, they can function very efficiently if speech and data can alternate between one another very quickly and flexibly within the system.

For example, a mobile user might desire a feature such as voice controlled automatic call routing. This service is implemented by having the subscriber phone a routing server connected within the fixed network and then inform the server, by means of voice recognition, to reroute all incoming calls from the subscriber's regular number to a certain specified alternate number. This service requires the transmission of both data, for the control commands to the server, and voice parameters for the spoken commands. Another possible application requiring the alternate transmission of speech and data is the use of voice enabled e-mail in which a user dials into a server which is connected within the fixed network and functions as a e-mail box. The user issues commands to the server via data transmissions to cause the server to display on the user's terminal a list of received e-mails and enable the user to scroll up and down that list and then request the server to read a selected one of those e-mails by voice synthesis. In this application, the user alternatively sends digital control commands and speech vectors between the user's terminal and the server. Still other "multimedia" applications are file transfer of digital data over the same connection while a user is talking to speech recognition software within the server, and the implementation of video conferencing over a single connection.

Many prior art references have contemplated the multiplexing of speech and data in a single communication channel. For example, in U.S. Pat. No. 4,813,040 entitled "Method and Apparatus for Transmitting Digital Data and Real-Time Digitized Voice Information Over Communication Channels" issued Mar. 14, 1989 to Futato, data are inserted into the silence periods of voice communications on a communication channel. Similarly, in PCT published application no. WO96/13916 entitled "Communications Method and Apparatus With Transmission of a Second Signal During Absence of a First One" the system transmits both a principal signal (voice) and a data signal. When the principal signal is present or contains information it is transmitted; however, when the principal signal is absent or does not contain a significant amount of information, data are transmitted through the channel. Neither of these systems contemplate solutions to the problems of alternate voice and data transmissions over a link including digital radio.

In digital radio systems such as TDMA digital cellular systems, digital speech content and digital data content are handled differently in the system. When the user speaks into a subscriber terminal of a digital radio system, the voice is encoded into speech parameters which are, in the full rate (FR) coding scheme of the Global System for Mobile communication (GSM), transmitted at 260 bits per 20 millisecond frame. This is a data rate of 13 K bits per second. When these encoded speech parameters reach the fixed network, they are conventionally converted by a speech decoder into normal 8K digital speech samples and transmitted at the rate of 64 K bits per second. In contrast, data are generally transmitted in the fixed network in accordance with somewhat different standards because of the inherently different characteristics between voice and data communications.

It is important for speech to undergo very few delays during transmission so that the other party receives it within a time frame which simulates normal conversation. The nature of digital speech is also such that errors in the digital representations of the speech are quite tolerable. Speech is redundant and the listener is also redundant so that communication is satisfactory and readily understandable even though a number of errors may occur in the transmission of the digital speech representations from one location to another. Data, on the other hand, is very intolerant of errors. Thus, it must be encoded with error correction coding and other techniques to ensure a high degree of accuracy in the transmission of the data from one point to another within a communication network. On the other hand, the delays in the transmission of data from one point to another are very tolerable in the case of data circuits. It does not usually matter that the data is delayed or buffered at various points in the transmission circuitry while the data is moving from one place to another within the network.

Because of these very different ways of handling speech and data in the communication network, it is infrequent that both can be efficiently transmitted in the same communication circuit. For example, in the multimedia facilities currently provided within the GSM cellular network, the speech portions of a circuit are handled by one set of infrastructure and the data portion of such circuits are handled by a different data path infrastructure. This results in a lack of synchronization of the two paths which make it difficult to implement services involving both. Thus, it is very difficult to combine in a single application, the alternate transmission of speech and data between two separate nodes in the network, especially one which includes a digital radio link.

The current GSM standards provide a variety of different service and traffic channels such as the three speech traffic channels full rate (FR), half rate (HR) and enhanced full rate (EFR), as well as many different types of data traffic channels. While GSM recommendations exist which describe solutions for simultaneous or alternative transmission of speech and data within one call, the practical realization of multimedia services suffers in many different aspects from insufficient specifications to insufficient realizations and insufficient support of the proposals by network operators.

For example, some of the drawbacks to existing suggested solutions include the fact that existing data services are not suitable for speech transmission due to long delays while current speech services are not transparent to data. In addition, "mode modification" between these two types of services are much too slow and cumbersome for practical implementation. Current solutions like USSD for GSM can carry slow speed data in parallel to a speech channel; however, unlike speech transmission, the USSD data is terminated in the fixed network and is not transparent. Furthermore, the delay for interactive data is greater than one second which produces unacceptably slow responses to user commands.

Additionally, dual tone multi frequency (DTMF) commands are often used for user services such as voice mail boxes. While the latency is relatively low and these commands are sent transparently through the network, the data rate is slow and DTMF is normally only implemented for signaling from a mobile and not in the other direction toward the mobile. Furthermore, current connections between a digital mobile station and an internet protocol (IP) phone either use a data connection or a gateway which converts speech to UDP/IP. The data connection is not optimized for speech like coded speech for radio and the delay is even longer due to more interleaving. The use of a gateway requires powerful computing in order to handle speech coding for several concurrent connections. Thus, in summary, the solution of how to achieve transparent speech as well as low latency data end-to-end for digital cellular phones, IP phones, service nodes, and the like has not been found within conventional prior art techniques.

An innovation in the specifications of the GSM cellular network which was recently promulgated, and which will be shortly adopted by the European Telecommunications Standard Institute (ETSI), is that set forth in section GSM 04.53, draft version 0.1.3, entitled "Inband Tandem Free Operation (TFO) of Speech Codecs." This innovation relates to an effort to improve the quality of speech communication between two subscribers in the case of a mobile terminal to mobile terminal call within the GSM network. As mentioned above, the conventional way of handling a speech call within a digital radio network, such as the GSM network, is to initially encode the speaker's voice at the mobile terminal into digital speech parameters representing certain characteristics of the output of the microphone in the terminal. For example, some parameters describe the spectral envelope of the speech signal, other parameters describe the volume and still others characterize the fine structure of the speech material. These encoded speech parameters are then transmitted at 13K bits per second via the radio interface to the fixed network where they are decoded into digital signals representing a voice signal sampled at the standard rate of 8 K samples per second. This signal is then transmitted through the fixed network to the terminating end of the conversation, which in the case of a mobile-to-mobile call, is another radio base station. Here the signal is again encoded from speech samples into speech parameters and transmitted over the air interface at 13 K bits per second. At the subscriber's mobile terminal the speech parameters are again decoded into an electrical representation of a voice signal for the loud speaker in the terminal. It is well known that each of these encoding and decoding operations are lossey in nature; that is, each time the signal is encoded and decoded a certain amount of error creeps into the signal resulting in a degradation of the voice signal from that which was originally spoken into the microphone. The purpose of the TFO scheme is to eliminate unnecessary encodings and decodings of the voice signals in the case of a mobile-to-mobile call. That is, with TFO functionality enabled, the encoded voice parameters transmitted over the air interface from the originating mobile station at 13 K bits per second are not decoded when they are received at the fixed network. Rather, they are transmitted transparently through the fixed network as 13 K bits per second speech parameters and from there back out over the air interface to the receiving mobile terminal. There the speech parameters are decoded into speech signals and applied to the loud speaker of the receiver's terminal. This eliminates one complete cycle of encoding and decoding while the signal passes through the fixed network and results in a considerably higher quality signal at the other end.

Referring to FIG. 1, there is shown a block diagram of the prior art implementation of TFO functionality within the GSM network. FIG. 1 depicts the functional entities for handling tandem free operation in a mobile station to mobile station call. A first mobile switching center (MSC1) is connected to communicate with a first base station controller (BSC1) which is in turn connected to a base transceiver station (BTS1) in turn connected via radio to a radio terminal (MS1). A tandem free operation-transcoder and rate adapter unit (TFO-TRAU1), which is physically part of either BTS1, BSC1 or MSC1, but here shown separately, is imposed within both the uplink (UL) and downlink (DL) to BTS1. In the uplink a decoder 11 is connected in parallel with a TFO transmitter (TFO-TX) 12 and their output signals are added at 13. On the downlink, an encoder 14 and a TFO-RX 15 have their outputs alternatively and selectively connectable through a switch 16.

Similarly, MSC2 is connected to BSC2 which is in turn connected to BTS2 in turn connected via radio to a radio terminal MS2. The second TFO-TRAU2, which is physically part of either BTS2. BSC2 or MSC2, but here shown separately, includes in the downlink an encoder 21 connected in parallel with TFO-RX 22 the outputs of which are selectively and alternatively connectable through a switch 23. In the uplink, a (speech) decoder 24 and TFO-TX 25 have their outputs connected through a replacement unit 26, symbolized by a "+" sign. In the TFO operation this unit replaces the one or two LSB of the PCM octets (digital representation of each speech sample) by one or two bits of the TFO frame (HR or FR cases, respectively). The TRAUs are controlled by the BTSs and the speech/data information and TRAU control signals are exchanged between the channel codec unit (CCU) in the BTS and the TRAU and are transferred in frames denoted "TRAU Frames." In tandem free operation similar frames are transported on the A interface between the TRAUs and denoted "TFO speech frames." In addition to these frames, signaling information is also transferred on the A interface using "TFO negotiation messages" which are mapped to the least significant bit of the PCM octets. As illustrated in the reference model of FIG. 1, when TRO operation is enabled, a transparent digital link is provided through the wire-bound network, in both directions, from the input of the speech decoder of one mobile to the output of the speech encoder of a second mobile. Since the GSM full rate speech traffic channel has 260 bits every 20 millisecond frame, these 260 bits are forward error encoded using an unequal error protection scheme and transmitted in packets of 456 bits within a 20 millisecond frame.

TFO-like schemes are also being proposed and implemented in other digital systems such as the U.S. D-AMPS standard pursuant to IS-54 and IS-136 and the Japanese digital standard (JDC). It would be desirable if TFO functionality in each of these digital systems could be used as part of a technique to alternately transmit speech and data within a digital radio network.

BRIEF SUMMARY OF THE INVENTION

In one aspect, the present invention includes alternately sending voice and data within a digital telecommunications network which includes a first node containing both a data source and a speech encoder connected to a network and which selectively sends a signal containing either data or speech parameters to the network. A second node containing data receiver and a speech decoder is connected to the network for both data and voice communication with the first node through the network. The speech encoder and decoder are selectively bypassed within the network to allow discrete blocks of digital information in the size and data rate of standard speech parameters to pass transparently through the network between the first node and the second node. A first inband signaling bit pattern is sent within one of the discrete blocks of digital information between the first node and the second node indicating that the digital information contained within the remainder of that block and successive blocks of digital information represent speech parameters. A second inband signaling bit pattern is sent within a successive one of the discrete blocks of digital information between the first node and the second node indicating that the digital information contained within the remainder of the block and successive blocks of digital information represent data. The digital information received at the second node is interpreted in accordance with the last received of the first or the second inband signaling bit pattern to enable the alternate transmission of both speech and data between the first node and the second node over a single communication channel.

In another aspect, the present invention includes alternately sending voice and data within a telecommunications network which includes at least one digital mobile station connected to a fixed network by means of an air interface and which sends and receives a signal which includes speech parameters to and from the fixed network. The fixed network includes radio base equipment containing a speech decoder for decoding speech parameters coming from the mobile station and a speech encoder for encoding speech from the fixed network into speech parameters for sending to the mobile station. A terminating node is connected to the fixed network for both data and voice communication with the digital mobile station through the fixed network. The speech encoders and decoders are selectively bypassed within the network to allow discrete blocks of digital information in the size and data rate of standard speech parameters to pass transparently through the network between the terminating node and the digital mobile station. A first inband signaling bit pattern is sent within one of said discrete blocks of digital information between the digital mobile station and the terminating node indicating that the digital information contained with the remainder of that block and successive blocks of digital information represent speech parameters. A second inband signaling bit pattern is sent within a successive one of the discrete blocks of digital information between the digital mobile station and the terminating node indicating that the digital information contained with the remainder of the block and successive blocks of digital information represents data. The digital information received at the digital mobile station and the terminal node is interpreted in accordance with the last received of the first or the second inband signaling bit pattern to enable the alternate exchange of both speech and data between digital mobile station and the terminal node over a single communication channel.

In still another aspect, the present invention includes alternately transmitting speech and data within a cellular radio communication network operating in accordance with the global system for mobile communications (GSM) specifications in which tandem free operation (TFO) is implemented so that the speech decoders and speech encoders within the network are selectively bypassable and speech parameters may be passed transparently through the network from one mobile station to another node. A first node, including a digital mobile radio subscriber station, is connected to a second node which comprises a service node connected within the network. Tandem free operation is implemented within the fixed communication network and a block of digital information, of about the same size and data rate as speech parameters, is sent between the first and second nodes. The block contains an inband signaling bit pattern which indicates to the receiving node whether the digital information to follow is to be interpreted by that node as speech or data. The sent block of digital information is received at the receiving node and interpreted in accordance with the indication contained in the inband signaling bit pattern as either speech or data.

In yet a further aspect, the present invention includes alternately sending voice and data within a digital telecommunications network which includes a first node containing both a data sink and a speech sink connected to a network, and in which the first node selectively receives a signal containing either data or speech parameters from the network. A second node containing a data source is connected to the network for data communication with said first node through the network and a third node containing a speech source is connected to the network for voice communication with the first node through the network. A communication connection is set up between the first node and both of the second and third nodes through a switch. Speech from the speech source of the third node is translated into speech parameters within the switch. A TX-alternator within the switch alternately selects either the translated speech parameters from the third node or the data from the second node and sends the selected digital information to the first node in discrete blocks. A first inband signaling bit pattern is sent within one of the discrete blocks of digital information from the TX-alternator within the switch to the first node indicating that the digital information contained within the remainder of that block and successive blocks of digital information represent speech parameters. A second inband signaling bit pattern is sent within a successive one of the discrete blocks of digital information sent from the TX-alternator within the switch to the second node indicating that the digital information contained within the remainder of that block and successive blocks of digital information represent data. The digital information received at an RX-alternator within the first node is interpreted in accordance with the last received of the first or the second inband signaling bit pattern to enable the alternate reception of the digital information blocks representing either speech or data at the speech sink or the data sink as appropriate.

BRIEF DESCRIPTION OF THE DRAWINGS

For an understanding of the present invention and for further objects and advantages thereof, reference can now be had to the following description, taken in conjunction with the accompanying drawings in which:

FIG. 3 is a block diagram illustrating one example of a complete transmission chain for a MS-to-server interconnection embodying another aspect of the present invention;

FIG. 4 is a pictorial diagram of the alternate transmission of speech and data in accordance with the present invention;

DETAILED DESCRIPTION OF THE PREFERRED EMBODIMENT

Figure 2:
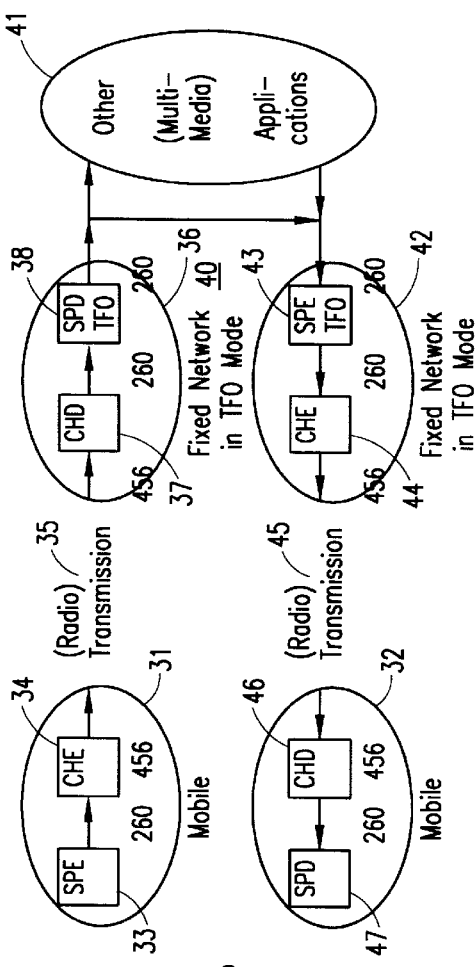
FIG. 2 is a block diagram of one embodiment of a system for alternating speech and data transmissions in a communication system including a digital radio link in accordance with the present invention.

Referring next to FIG. 2, there is shown a block diagram of a specific implementation of the system of the present invention for digital cellular radio systems. The present invention is described herein using the GSM full rate speech traffic channel as only one possible example. However, the present techniques of using a TFO-like function to facilitate the alternate exchange of speech and data are easily transferable to other codecs and systems such as the GSM half rate codec (HR), the GSM enhanced fill rate codec (EFR), the U.S. TDMA standard codecs (D-AMPS), the Japanese digital standard (JDC) codecs and the proposed GSM-AMR family of codecs. Each of these codecs would have a different net bit rate (the bit rate of the unprotected speech parameters) as well as a different gross bit rate (the bit rate sent over the radio channel after suitable forward error correction). In addition, the amount of speech signal coded within one block of speech parameters (the speech frame), which is conventionally 20 ms, may also be different, for example 10 ms.

In FIG. 2, there is shown an exemplary transmission from a first mobile station 31 through the air interface and the fixed network to a second mobile station 32. The first mobile station 31 includes a speech encoder 33 and a channel encoder 34. The encoded speech parameters are transmitted at about 13K bits per second over the air interface 35 to a fixed network operating in TFO mode. The broadcast speech parameters are received at a base transceiver station 36 which contains a channel decoder 37 and a speech decoder 38. Since the fixed network is being operated in the TFO mode the speech decoder 38 is bypassed so that the speech parameters are not decoded and, instead, pass into and transparently through the fixed network at 13K bits per second. The fixed network 40 includes the possibility of connection to numerous other nodes which may provide a wide variety of multimedia applications 41. These nodes may include servers upon which are running applications which provide, for example, voice controlled call transfer, voice synthesized recovery of e-mail, simultaneous file transfer and voice interactions, video conferencing and other services which require alternate transmission of voice and data over the same communications link. The fixed network 40 is also connected to other base station equipment 42 which also includes a speech encoder 43 operating in TFO mode and a channel encoder 44. Again, since the fixed network is being operated in TFO mode the speech encoder 43 is bypassed and the encoded speech parameters which have passed transparently through the network pass transparently through the encoder 43 and into the channel coder 44. The channel encoded signal is transmitted via the air interface 45 to the second mobile 32 which includes a channel decoder 46 and a speech decoder 47. The voice signal is then delivered to the speaker of the second mobile 32.

As described above, when the fixed network 40 is operating in TFO mode, the speech decoder 38 and the speech encoder 43 are both disabled or bypassed so that the encoded speech parameters pass transparently through the fixed network 40 out to the other mobile 32 for decoding.

Once a TFO call is established with a mobile subscriber station, as illustrated for the case of a mobile to-mobile call between two subscriber stations in FIG. 2, both ends of the communication link, i.e. mobile stations 31 and 32, can transmit speech packets of 260 bits every 20 millisecond providing a transmission capacity of 13 K bits per second in both directions. It is up to the specific application how this transmission capacity is used. In the normal case the capacity is used for the transmission of the speech parameters between the two mobile stations 31 and 32.

By marking one or more of the 260 bit speech packets inband by certain specified bit patterns, one end of the application can signal to the other end how it is to construe the meaning of the bits contained within the packets. Thus, rather than representing encoded speech parameters, each of the 260 bit speech packets could be defined to contain information other than speech. For example, any type of digital data could be contained within the packets following an inband signal specifying the nature of the data contained within those packets. Transmission and interpretation of the packets as data would continue until the occurrence of a final data packet which again contains inband signaling indicating the transition of the content of the speech packet back to being interpreted as a conventional speech packet again. This toggling of the meaning of the content of the packets could be repeated as many time as desired under the control of a specific application. Of course, in this mode of operation, speech transmission is interrupted as long as data packets are being used for data transmission.

The "marking pattern" used in the inband signaling to define the interpretation to be applied to the data packets must be sufficiently long to be substantially unlikely to occur during normal speech transmission. Statistically, the use of an inband signaling marking pattern of a length typically, for example, between 80 and 100 bits is more than sufficient to minimize the chance occurrence of a recognizable pattern during normal speech transmissions. Presuming a simple definition of reserving 100 bits for the inband marking of packets, another 160 bits (out of the total of 260 bits per packet) would be left for additional data transmissions within that packet. Based upon the specific design and implementation of an application, these data within the 160 bit block could be the only data transmission within that sequence and the next packet could revert to normal speech again. Alternatively, all the packets following the inband signal could also be data packets leaving the entire 260 bits of each of those packets for the transmission of data until the occurrence of a final data packet containing another inband signal marking bit pattern indicating that the system was switching back to speech transmission again.

While the GSM-FR coder used herein as an example produces a 260 bit packet within each 20 ms block, other exemplary coders would produce different gross and net bit rates as set forth below in Table I. Moreover, other coders, both existing and those developed in the future, will differ in net and gross bit rates, which therefore may require adaption of the scheme discussed here in terms of the number of bits to be used for signaling and data transport. The basic principle of the present invention, however, is not affected by the actual numbers.

TABLE I

| Codec: | Net Bit Rate | Bit per 20 ms block | Gross Bit Rate |
|---|---|---|---|
| GSM-FR | 13.0 kBit/s | 260 | 22.8 kBit/s |
| GSM-HR | 5.60 kBit/s | 112 | 11.4 kbits/s |
| GSM-EFR | 12.2 kBits/s | 244 | 22.8 kBits/s |

Referring next to FIG. 3, there is shown a block diagram of one example of a complete transmission chain for the mobile station (MS)-to-server case for implementation of one aspect of the present invention. In the case of two way traffic between the nodes it is important that both ends of the connection include a speech coder and decoder and that the connection between the two nodes is digitally transparent. Of course, for applications which can be implemented with only one way speech and data traffic, the speech originating end of the connection must include a speech encoder and the speech terminating end of the connection must include a speech decoder and the connection therebetween must be digitally transparent.

As shown in FIG. 3, a mobile station 61 includes a data encoder 62 and a speech encoder 63 both of which are connected to a TX-alternator 64 and a channel encoder 65. The modulated output signal from the channel encoder is transmitted at radio frequencies across an air interface 66 to a base transceiver station 67. The base transceiver station includes a channel decoder and is connected through the network interface 69 to a TFO transmitter (TFO-TX) 70 contained within the tandem free operation-transcoder and rate adapter unit (TFO-TRAU) 71. The output of the TFO-TRAU 71 passes through the network interface to a multimedia-server (MMS) 73 connected to the network. The MMS 73 includes an RX-alternator 74 connected to both a data decoder 75 and a speech decoder 76. This completes the path from the MS 61 to the MMS 73 over which both voice and speech pass from the MS to the MMS at different times during a call.

Similarly, the MMS 73 includes a speech encoder 77 and a data encoder 78 which are coupled to a TX-alternator 79. The signal from the alternator passes through the network 72 into an TFO receiver (TFO-RX) 81 and from there through the network 69 to the base transceiver station 67 and a channel encoder 82. The signal next passes from the base transceiver station across the air interface 66 to the mobile station 61 into a channel decoder 83 connected to a RX-alternator 84 which is, in turn, connected to a data decoder 85 and a speech decoder 86. This completes the path from the MMS 73 to the MS 61 over which both speech and data travel from the MMS to the MS at different times during a call.

Figure 1:
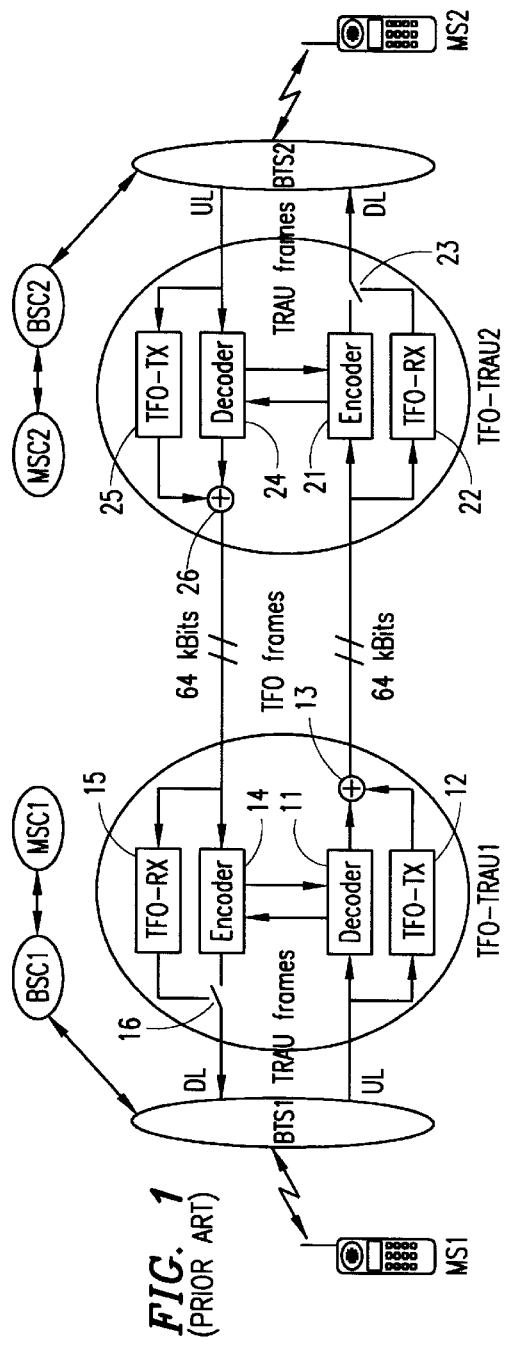
FIG. 1 is a block diagram of a prior art reference model of the functional entities for handling tandem free operation (TFO) in a mobile-to-mobile call in the GSM digital cellular system.

As discussed above, each of the TX-alternators 64 in the MS 61 and 79 in the MMS 73 serve to replace, in the GSM-FR codec example, the two least significant bits (LSBs) of the PCM octets with two bits of the TFO frame. For example, with reference to the prior art FIG. 1, in the uplink a speech decoder 11 and a TFO-TX 12 have their outputs connected through a replacement unit 13 equivalent to the TX-alternator 64. With the system in TFO operation the replacement unit replaces the two LSBs of the PCM octets by two bits of the TFO frame. When the information path is selectably placed in TFO mode, the TFO-TRAU renders the entire path through the network digitally transparent to either speech or data passing through the network.

As illustrated in FIG. 4, a sequence of 260 bit packets associated with a system including a GSM-FR codec is illustrated in which the first packet in the sequence includes an inband signaling pattern 51 and the remaining 160 bits of that 260 bit frame include data. The pattern 51 indicates that all of the transmissions following that pattern, until a further indication is received, will contain data. Thus, the 160 bit block 52 is data as well as the 260 bit block 53. The next frame 54 begins with an inband signaling pattern 55 which indicates that the digital information following that pattern will be speech until further notice and, thus, the 160 bit block 56 as well as the 260 bit block 57 contains speech.

Since not all of the 260 bits are equally well protected against bit errors and since the protection used for speech may not be sufficient for some data applications, additional channel error protection may be needed inside of the 260 bits. Thus, forward error correction (FEC) such as another one half rate convolutional code or some other technique optimized for a particular application can be used. Alternatively, error protection by automatic repeat request (ARQ) protocols and the like can also be used, however, this is completely left to the particular application and is not dependent upon the particular technique of the present invention.

For many applications, a one-half rate forward error correction (FEC) technique within the 182 well protected bits and quarter rate FEC within the 78 unprotected bits (in the case of full rate coding) may be sufficient resulting in a net bit rate of approximately 96 bits per 20 millisecond frame or a 4.8 K bit per second data rate. The delay using this coding would be on the order 90 milliseconds each way.

It should also be noted that the TFO is switched to the desired mode for the duration of a whole call. However, when the TFO is in transparent mode, the fast alteration according to the present invention is achieved, in each direction separately, by the associated RX-alternator under control of the described inband signaling pattern transmitted by the TX-alternator.

It should be noted that TFO operation can be initiated by either party to a communication without intervention of either the base site controller (BSC) or the mobile switching center (MSC). The terminals or terminating nodes used can all be combinations of mobile stations (MS), PBXs, service nodes, ISDN phones, IP phones and many other types of terminals. Each party can control the TRAU independently in each respective direction with the possible modes being either: (a) speech coder/decoder in operation; or (b) digitally transparent for TFO or user data.

When transparent, the GSM-FR speech data of 13 K bits per second are sent untouched over the 64 K bits per second PCM channel provided by the network infrastructure using the two LSBs of each PCM octet or any other transparent digital data channel. Thus, a fully transparent digital connection is established. In the case of a mobile station to mobile station connection, the standard TFO case where both TRAUs are disconnected, the terminals can communicate transparently and alternately with both coded speech and the exchange of data.

In the case of a mobile station (MS) to service node (SN) connection, such as would be particularly useful for the implementation of many multimedia applications made available to a mobile subscriber, speech is encoded/decoded only in the MS and SN, but not in the TRAU and, again, both parties can send alternate data and coded speech. This requires that the service node has a digital connection to the transmission network.

In the case of mobile station to IP phone, the speech is not coded/decoded in the TRAU. Rather, the speech is coded only in the MS and in the IP phone if the same coding is used in both terminals. Alternate speech and data transmissions are possible in this configuration.

In addition to this participation of two parties as illustratively illustrated above, several parties can be part of the same connection utilizing the principles of the present invention. For example, a single terminal may be connected via its service node to a second service node to which a number of additional parties can connect.

Figure 5:
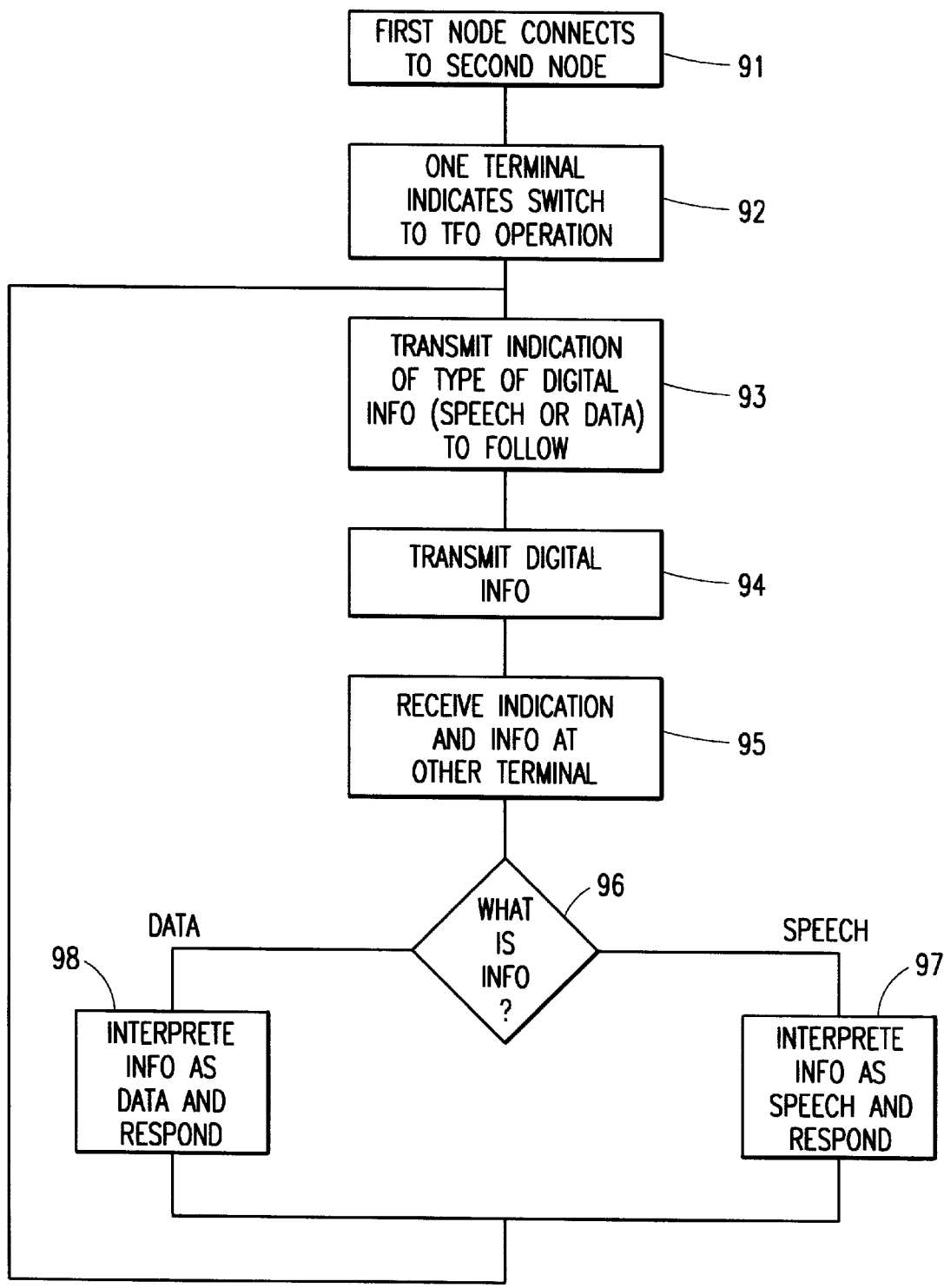
FIG. 5 is a flow chart showing one aspect of a method in accordance with the present invention.

Referring next to FIG. 5, there is shown a flow chart depicting a method by which one embodiment of the system of the present invention may operate and illustrating, by way of example, the transmission of digital information in only one direction. At 91, a mobile station connects to a service node included, for example, within the network infrastructure. At 92, either the service node or the mobile terminal indicates a switch to tandem free operation (TFO). At 93, one of the terminal or node transmits an indication within an inband signaling bit pattern indicating the type of digital information, i.e. speech or a particular species of data, which is to follow from that terminal or node to the other. At 94, the digital information is transmitted and at 95, received by the other terminal. At 96, the receiving terminal determines from the indication within the inband signaling bit pattern the nature of the digital information which has been received and at 97 processes the information as speech in the case the indication is for speech and responds appropriately. At 98, the system interprets information as data in accordance with the indication and processes it appropriately. Thereafter, the system returns to 93, and one of the other terminal or service node sends another bit pattern indication followed by digital information in order to perform in accordance with the procedures of the particular application which is being implemented.

Figure 6:
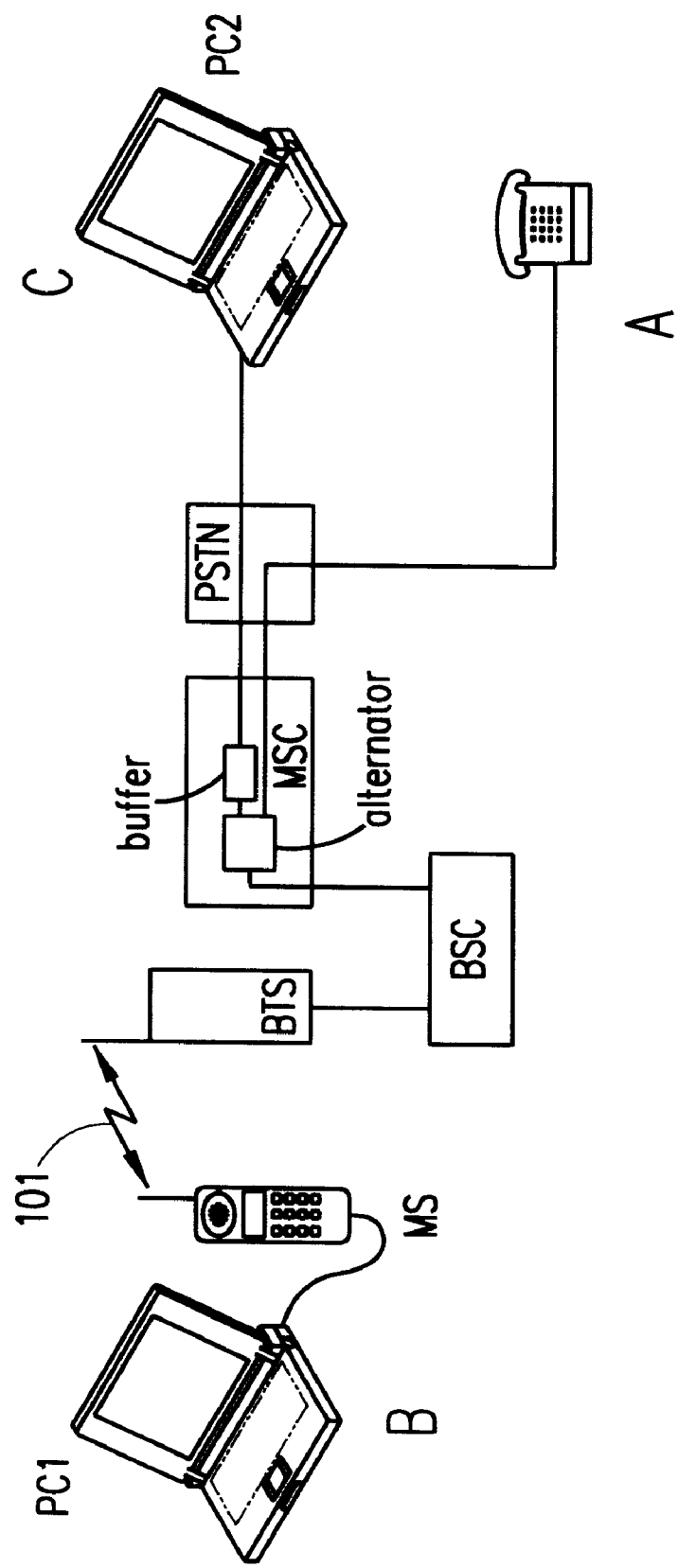
FIG. 6 is a block diagram of still another embodiment of a system for alternating speech and data transmissions in a communication system including two or more terminals.

Referring next to FIG. 6, there is shown a block diagram depicting an embodiment incorporating another aspect of the present invention. FIG. 6 shows a system for alternating speech and data transmissions in a communications system including more than two terminals. In the embodiments of the invention described above in connection with FIGS. 1–5, two terminals were communicating with each other alternatingly using speech and data codes as may be required in multimedia application between two subscribers. In the embodiment of FIG. 6, a three party communication is illustrated. A subscriber A, operating in accordance with Plain Old Telephone Service (POTS) principles, calls a subscriber B who is communicating with both a mobile radio terminal MS and a laptop computer PC. The call is illustratively set up via the Public Switched Telephone Network (PSTN) and the GSM network which includes a Mobile Services Switching Center (MSC), a Base Station Controller (BSC), a Base Transceiver Station (BTS) and a radio air-interface indicated by the arrow 101. A third subscriber C communicating with a laptop computer PC2 sends an E-mail message to subscriber B which message is stored in a buffer in the MSC waiting for an opportunity to be delivered to B. The E-mail service includes a program in the MSC which is instructed to send any E-mail messages preferably as background data during a period when the subscriber B is called by or calls another subscriber. It is only in the event that no such calls occur during a predetermined time period that the E-mail service is programmed (for example, as may be specified by the party originating the E-mail message) to set up a dedicated call to the subscriber B in order to deliver the E-mail message. Thus, at a given time a three party communication takes place between the subscribers A, B and C wherein one communication is a real time speech connection and another independent communication is a store and forward connection involving a third subscriber C. One advantage of this three party embodiment of the invention include, apart from the economical advantage of employing otherwise unused connection time is the possibility to reach a subscriber while he/she is talking over the telephone with somebody else.

Figure 7:
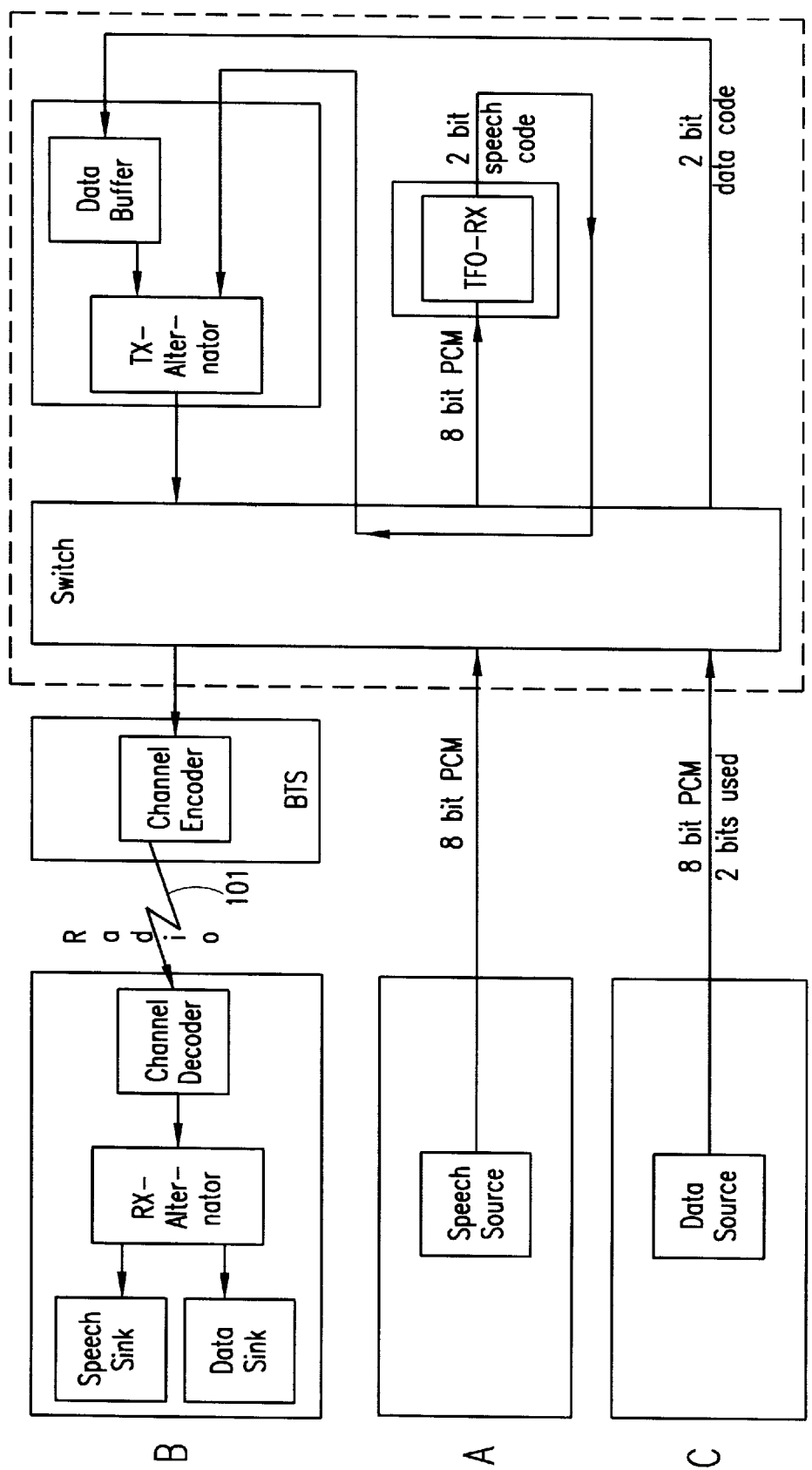
FIG. 7 is a block diagram depicting further details of the system illustrated in FIG. 6.

FIG. 7 is a block diagram depicting illustrative details related to the embodiment of FIG. 6 and shows only the uplink connection from the subscribers A and C to the subscriber B. The speech from subscriber A is transmitted in Pulse Code Modulation (PCM) as 8 bit samples of speech. These samples are switched in the MSC to a block TFO-RX which translates the 8 bit PCM code into the air-interface code of GSM occupying only 2 bits of an 8 bit PCM word. The 8 bit PCM words, each containing 2 relevant bits and 6 unused bits, pass again through the switch which handles 8 bit words. From there the speech information enters a block that alternates between this speech information and E-mail data during the time the uplink connection is not used by speech transmission. This is performed as follows: the TX-alternator senses when there is no speech, sends a special unique pattern P1, as explained earlier, as a header of E-Mail data taken from the Data Buffer. Alternately, the TX-alternator sends a different special unique pattern P2 as a header and then speech code from Subscriber A. The special unique (inband) patterns P1 and P2, cause the RX-alternator to switch the arriving data to the speech sink or the Data sink as applicable. The transmission goes from the TX-alternator, as can be seen in the block diagram of FIG. 7, through the switch to the BSC (not shown), the BTS, including a channel encoder, via a GSM air-interface 101 to the terminal B. The TFO-RX is a member of a group of devices that can be used by a connection when required for code translation. If subscriber A has a mobile radio terminal no code translation and therefore no TFO-RX is required and the A to B connection passes through the switch only once.

It should be noted that the TFO-RX is selected or not selected for the duration of a whole call whereas the selection of speech and E-mail data is faster and occurs many times during a call. The simplified block diagrams of FIGS. 6 and 7 show one possible implementation of alternating speech and E-mail. However, many variations are possible, such as e.g., the use of a service node where E-mail messages are stored until they are to be transmitted to the subscriber B. This has the advantage of storing the E-mail in a fixed place whereas the MSC to be used may change due to the moving subscriber B. These varieties are easily perceived by those knowledgeable in the art and do not need further explanation.

It should be noted that the particular application decides how to use the information packets without changing the implementation of the fixed network and thus, the system of the invention may be implemented without any influence or cooperation by the network operator. The present invention provides a totally open interface for many new applications depending upon the desired service.

Although preferred embodiments of the method and apparatus of the present invention have been illustrated in the accompanying drawings and described in the foregoing description, it is understood that the invention is not limited to the embodiment(s) disclosed but is capable of numerous rearrangements, modifications and substitutions without departing from the spirit of the invention as set forth and defined in the following claims.

What is claimed is:

1. A method of alternately sending voice and data within a digital telecommunications system which includes a first node containing both a data source and a speech encoder connected to a network and which selectively sends a signal containing either data or speech parameters to said network, said method comprising:

providing a second node containing a data receiver and a speech decoder connected to said network for both data and voice communication with said first node through said network;

selectively bypassing a speech encoder and decoder within said network to allow discrete blocks of digital information, in the size and data rate of standard speech parameters, to pass transparently through said network from said first node to said second node;

sending a first inband signaling bit pattern within one of said discrete blocks of digital information from said first node to said second node indicating that the digital information contained within the remainder of that block and successive blocks of digital information represent speech parameters;

sending a second inband signaling bit pattern within a successive one of said discrete blocks of digital information sent from said first node to said second node indicating that the digital information contained within the remainder of that block and successive blocks of digital information represent data;

interpreting the digital information received at said second node in accordance with the last received of said first or said second inband signaling bit pattern to enable the alternate sending of both speech and data from said first node to said second node over a single communication channel.

2. A method of alternately sending voice and data within a telecommunications system as set forth in claim 1 wherein said network is a cellular radio network operating in accordance with the global system for mobile communications (GSM) specifications and said step of selectively bypassing said speech encoder and decoder within said network to allow discrete blocks of digital information in the size and data rate of standard speech parameters to pass transparently through said network between said first and second terminating nodes, includes invoking the operation of said GSM network in accordance with tandem free operation (TFO) specifications.

3. A method of alternately sending voice and data within a telecommunications system as set forth in claim 2 wherein said discrete blocks of digital information are sent between said first and second nodes at a transmission rate on the order of 13K bits/second.

4. A method of alternately sending voice and data within a telecommunications system as set forth in claim 3 wherein both speech parameters and data are sent over said network in discrete blocks of digital information at the GSM-FR rate of about 13K bits/second and pass untouched over the 64K bits/second PCM channel provided by the network infrastructure.

5. A method of alternately sending voice and data within a telecommunications system as set forth in claim 1 wherein said second node connected to said network is a server running an application for providing a user service to said first node.

6. A method of alternately sending voice and data within a telecommunications system as set forth in claim 5 wherein said server running said application for providing a user service to said first node determines the particular interpretation to be given to the data which follows said second inband signaling bit pattern.

7. A method of alternately sending voice and data within a telecommunications system as set forth in claim 1 wherein said first node connected to said network is a digital mobile subscriber station.

8. A method of alternately sending voice and data within a telecommunications system as set forth in claim 1 wherein said discrete blocks of data are sent from said first node over a general transmission channel exposed to noise and said steps of sending said first and second inband signaling bit patterns within each of said discrete blocks of digital information between said first and second nodes indicating that the digital information contained with the remainder of that block and successive blocks of digital information represent either speech parameters or data further include:

channel encoding said discrete blocks of data to reduce in said first node errors which may occur during transmission; and channel decoding said discrete blocks of data.

9. A method of alternately sending voice and data within a telecommunications system as set forth in claim 5 wherein said steps of sending said first and second inband signaling bit patterns within each of said channel coded discrete blocks of digital information between said first and second nodes indicating that the digital information contained with the remainder of that block and successive blocks of digital information represent either speech parameters or data further include:

encoding said discrete blocks of data with forward error correction coding to further reduce errors which may occur during transmission.

10. A method of alternately sending voice and data within a telecommunications system as set forth in claim 1 wherein said first node further includes a speech decoder for decoding speech parameters coming from said network, said second node further includes a speech encoder for encoding speech parameters to be sent to said first node through said network, and said network further includes a speech decoder for decoding speech parameters coming from said second node and a speech encoder for encoding speech passing through said network into speech parameters for sending to said first node to enable the alternate sending of voice and data in both directions between said first and second nodes, wherein:

said step of selectively bypassing said speech encoder and decoder within said network selectively bypasses speech encoders and decoders in both directions to allow discrete blocks of digital information, in the size and data rate of standard speech parameters, to pass transparently through said network in both directions between said first and second nodes;

said step of sending a first inband signaling bit pattern within one of said discrete blocks of digital information includes sending said pattern in both directions between said first and second nodes indicating that the digital information contained with the remainder of that block and successive blocks of digital information represent speech parameters;

said step of sending a second inband signaling bit pattern within a successive one of said discrete blocks of digital information includes sending said pattern in both directions between said first and second node indicating that the digital information contained with the remainder of that block and successive blocks of digital information represent data;

said step of interpreting the digital information in accordance with the last received of said first or said second inband signaling bit pattern is performed at both said first and second nodes to enable the alternate sending of both speech and data between said first and second nodes over a single communication channel.

11. A method of alternately sending voice and data within a telecommunications system as set forth in claim 1 wherein said first node is a subscriber terminal operating in accordance with internet protocol (IP) connected to said network over the internet.

12. A method of alternately sending voice and data within a telecommunications system which includes at least one digital mobile station connected to a fixed network by means of an air interface and which sends and receives a signal containing speech parameters, to and from said fixed network, said fixed network including radio base equipment containing a speech decoder for decoding speech parameters coming from said mobile station and a speech encoder for encoding speech from said fixed network into speech parameters for sending to said mobile station, said method comprising:

providing a terminating node connected to said fixed network for both data and voice communication with said digital mobile station through said fixed network;

selectively bypassing said speech encoders and decoders within said fixed network to allow discrete blocks of digital information, in the size and data rate of standard speech parameters, to pass transparently through said network between said terminating node and said digital mobile station;

sending a first inband signaling bit pattern within one of said discrete blocks of digital information between said digital mobile station and said terminating node indicating that the digital information contained with the remainder of that block and successive blocks of digital information represent speech parameters;

sending a second inband signaling bit pattern within a successive one of said discrete blocks of digital information between said digital mobile station and said terminating node indicating that the digital information contained with the remainder of that block and successive blocks of digital information represent data;

interpreting the digital information received at said digital mobile station and said terminal node in accordance with the last received of said first or said second inband signaling bit pattern to enable the alternate exchange of both speech and data between said digital mobile station and said terminal node over a single communication channel.

13. A method of alternately transmitting speech and data within a cellular radio communication system operating in accordance with the global system for mobile communications (GSM) specifications in which tandem free operation (TFO) is implemented so that the speech decoders and speech encoders within the fixed portion of the network are selectively bypassable so that speech parameters may be passed transparently through the fixed network from one mobile station to another mobile station, said method comprising:

connecting a first node, including a digital mobile radio subscriber station, to a second node comprising a service node connected within the network;

implementing tandem free operation within the fixed communication network;

sending a block of digital information, of about the same size and data rate as speech parameters are sent within said network, between said first and second nodes, said block containing an inband signaling bit pattern which indicates to the receiving node whether the digital information to follow is to be interpreted by that node as speech or data;

receiving the sent block of digital information at the receiving node;

interpreting the received block of digital information at the receiving node in accordance with the indication contained in the inband signaling bit pattern as either speech or data.

14. A method of alternately transmitting speech and data within a cellular radio communication system as set forth in claim 13 wherein said block of digital information sent between said first and second nodes is of a size which is greater than that of the inband signaling bit pattern which it includes and wherein the digital information following said bit pattern within said same block is interpreted as either speech or data in accordance with the configuration of said pattern.

15. A method of alternately transmitting speech and data within a cellular radio communication system as set forth in claim 13 wherein all successive blocks of digital information sent between said first and second nodes following said block which contains said inband signaling bit pattern are interpreted by the receiving node as either speech or data in accordance with the configuration of said pattern and until another block containing another different inband signaling bit pattern is received by said node.

16. A method of alternately transmitting speech and data within a cellular radio communication system as set forth in claim 13 wherein said block of digital information sent between said first and second nodes is of a size which is greater than that of the inband signaling bit pattern which it includes and wherein said bit pattern also contains an indication of the number of following successive blocks of digital information following said block containing said bit pattern which are to be interpreted as either speech or data in accordance with the configuration of said pattern.

17. A method of alternately transmitting speech and data within a cellular radio communication system as set forth in claim 13 wherein said second node comprising a service node connected within the network is a server running an application for providing a user service to said digital mobile station.

18. A method of alternately sending voice and data within a digital telecommunications system which includes a first node containing both a data sink and a speech sink connected to a network, and in which said first node selectively receives a signal containing either data or speech parameters from said network, said method comprising:

providing a second node containing a data source connected to said network for data communication with said first node through said network;

providing a third node containing a speech source connected to said network for voice communication with said first node through said network;

setting up a communication connection between said first node and both of said second and third nodes through a switch;

translating the speech from the speech source of said third node into speech parameters;

providing a TX-alternator within said switch to alternately select either said speech parameters from said third node or said data from said second node and send said selected digital information to said first node in discrete blocks;

sending a first inband signaling bit pattern within one of said discrete blocks of digital information from said TX-alternator within said switch to said first node indicating that the digital information contained within the remainder of that block and successive blocks of digital information represent speech parameters;

sending a second inband signaling bit pattern within a successive one of said discrete blocks of digital information sent from said TX-alternator within said switch to said second node indicating that the digital information contained within the remainder of that block and successive blocks of digital information represent data; and interpreting the digital information received at an RX-alternator within said first node in accordance with the last received of said first or said second inband signaling bit pattern to enable the alternate reception of said digital information blocks representing either speech or data at said speech sink or said data sink as appropriate.

19. A method as set forth in claim 18 wherein said speech from said speech source of said third node is initially PCM encoded and then translated into speech parameters within said switch.

20. A method as set forth in claim 18 wherein digital information from said data source within said second node is first stored within a buffer before selection by said TX-alternator.

21. A method as set forth in claim 20 wherein said digital information stored in said buffer includes electronic mail directed to said first node.

22. A method as set forth in claim 21 wherein said electronic mail within said buffer is only delivered to said first node as background data during a time period when said first node is called by or calls said third node through said switch.

23. A method as set forth in claim 18 wherein said first node is connected to said network through a radio air-interface.

24. A method as set forth in claim 18 wherein said second node is a service node within which electronic mail messages are stored.

25. A method for alternately sending speech and data from a first node to a second node within a digital telecommunications system wherein said first node contains a speech source for sending blocks of digital information containing speech parameters to said second node through said network and a data source for sending digital information comprising data to said second node through said network and wherein said second node contains a speech sink for receiving said blocks of digital information containing speech parameters sent from said first node and a data sink for receiving said blocks of digital information comprising data sent from said first node, said method comprising:

providing a TX-alternator within said first node and an RX-alternator within said second node, sending from said TX-alternator within said first node to said second node a first inband signaling bit pattern within a block of digital information indicating that the digital information contained within the remainder of that block and each successive block of digital information represent data;

sending from said TX-alternator within said first node to said second node a second inband signaling bit pattern within a block of digital information indicating that the digital information contained within the remainder of that block and each successive block of digital information represent speech parameters;

receiving successive blocks of digital information at said second node;

detecting with said RX-alternator within said second node the presence of either said first inband signaling bit pattern or said second inband signaling bit pattern within said received blocks of information and alternatively interpreting the received blocks of information following the last received one or the other of said inband signaling bit patterns as either data or speech parameters; and handing over blocks of information containing speech parameters to said speech sink for processing and blocks of information containing data to said data sink for processing to enable the alternate transmission of both speech and data from said first node to said second node over a single communication channel.

26. A method of alternately sending voice and data within a telecommunications system as set forth in claim 25 wherein said speech source within said first node includes a speech encoder and said speech sink within said second node includes a speech decoder and wherein said method includes the additional step of:

selectively bypassing said speech encoder and decoder within said first and second nodes to allow discrete blocks of digital information, in the size and data rate of standard speech parameters, to pass transparently through said network from said first node to said second node in accordance with tandem free operation.

27. A system for alternately sending voice and data within a digital telecommunications system which includes a first node containing both a data source and a speech encoder connected to a network and which selectively sends a signal containing either data or speech parameters to said network, said network including a speech decoder for decoding speech parameters coming from said first node and a speech encoder for encoding speech passing through said network into speech parameters for sending to a second node, comprising:

means for providing a second node containing a data receiver and a speech decoder connected to said network for both data and voice communication with said first node through said network;

means for selectively bypassing said speech encoders and decoders within said network to allow discrete blocks of digital information, in the size and data rate of standard speech parameters, to pass transparently through said network from said first node to said second node;

means for sending a first inband signaling bit pattern within one of said discrete blocks of digital information from said first node to said second node indicating that the digital information contained with the remainder of that block and successive blocks of digital information represent speech parameters;

means for sending a second inband signaling bit pattern within a successive one of said discrete blocks of digital information sent from said first node to said second node indicating that the digital information contained with the remainder of that block and successive blocks of digital information represent data;

means for interpreting the digital information received at said second node in accordance with the last received of said first or said second inband signaling bit pattern to enable the alternate sending of both speech and data from said first node to said second node over a single communication channel.

28. A system for alternately sending voice and data within a telecommunications network as set forth in claim 27 wherein said network operates in accordance with the global system for mobile communications (GSM) specifications and said step of selectively bypassing said speech encoder and decoder within said network to allow discrete blocks of digital information in the size and data rate of standard speech parameters to pass transparently through said network between said first and second terminating nodes, includes invoking the operation of said GSM network in accordance with tandem free operation (TFO) specifications.

29. A system for alternately sending voice and data within a telecommunications system as set forth in claim 28 wherein said discrete blocks of digital information are sent between said first and second nodes at a transmission rate on the order of 13K bits/second.

30. A system for alternately sending voice and data within a telecommunications system as set forth in claim 29 wherein both speech parameters and data are sent over said network in discrete blocks of digital information at the GSM-FR rate of about 13K bits/second and pass untouched over the 64K bits/second PCM channel provided by the fixed network infrastructure using the least significant bits thereof.

31. A system for alternately sending voice and data within a telecommunications system as set forth in claim 28 wherein said second node connected to said network is a server running an application for providing a user service to said first node.

32. A system for alternately sending voice and data within a telecommunications system as set forth in claim 28 wherein said first node connected to said network is a digital mobile subscriber station.

33. A system for alternately sending voice and data within a telecommunications system as set forth in claim 31 wherein said server running said application for providing a user service to said first node determines the particular interpretation to be given to the data which follows said second inband signaling bit pattern.

34. A system for alternately sending voice and data within a telecommunications system as set forth in claim 27 wherein said means for sending said first and second inband signaling bit patterns within each of said discrete blocks of digital information between said first and second nodes indicating that the digital information contained with the remainder of that block and successive blocks of digital information represent either speech parameters or data further include:

means for channel coding said discrete blocks of data to reduce errors which may occur during transmission.

35. A system for alternately sending voice and data within a telecommunications system as set forth in claim 34 wherein said means for sending said first and second inband signaling bit patterns within each of said channel coded discrete blocks of digital information between said first and second nodes indicating that the digital information contained with the remainder of that block and successive blocks of digital information represent either speech parameters or data further include:

means for encoding said discrete blocks of data with forward error correction coding to further reduce errors which may occur during transmission.

36. A system for alternately sending voice and data within a telecommunications system as set forth in claim 27 wherein said first node is a subscriber terminal operating in accordance with internet protocol (IP) connected to said network over the internet.

37. A system for alternately sending voice and data within a telecommunications system as set forth in claim 27 wherein said first node further includes a speech decoder for decoding speech parameters coming from said network, said second node further includes a speech encoder for encoding speech parameters to be sent to said first node through said network, and said network including a speech decoder for decoding speech parameters coming from said second node and a speech encoder for encoding speech passing through said network into speech parameters for sending to said first node to enable the alternated sending of voice and data in both directions between said first and second nodes, wherein:

said means for selectively bypassing said speech encoder and decoder within said network selectively bypasses speech encoders and decoders in both directions to allow discrete blocks of digital information, in the size and data rate of standard speech parameters, to pass transparently through said network in both directions between said first and second nodes, said means for sending a first inband signaling bit pattern within one of said discrete blocks of digital information includes sending said pattern in both directions between said first and second nodes indicating that the digital information contained with the remainder of that block and successive blocks of digital information represent speech parameters;

said means for sending a second inband signaling bit pattern within a successive one of said discrete blocks of digital information includes sending said pattern in both directions between said first and second node indicating that the digital information contained with the remainder of that block and successive blocks of digital information represent data;

said means for interpreting the digital information in accordance with the last received of said first or said second inband signaling bit pattern is located in both said first and second nodes to enable the alternate sending of both speech and data between said first and second nodes over a single communication channel.

38. A system for alternately sending voice and data within a telecommunications system which includes at least one digital mobile station connected to a fixed network by means of an air interface and which sends and receives a signal containing speech parameters, to and from said fixed network, said fixed network including radio base equipment containing a speech decoder for decoding speech parameters coming from said mobile station and a speech encoder for encoding speech from said fixed network into speech parameters for sending to said mobile station, said system comprising:

means for providing a terminating node connected to said fixed network for both data and voice communication with said digital mobile station through said fixed network;

means for selectively bypassing said speech encoders and decoders within said fixed network to allow discrete blocks of digital information, in the size and data rate of standard speech parameters, to pass transparently through said network between said terminating node and said digital mobile station;

means for sending a first inband signaling bit pattern within one of said discrete blocks of digital information between said digital mobile station and said terminating node indicating that the digital information contained with the remainder of that block and successive blocks of digital information represent speech parameters;

means for sending a second inband signaling bit pattern within a successive one of said discrete blocks of digital information between said digital mobile station and said terminating node indicating that the digital information contained with the remainder of that block and successive blocks of digital information represent data;

means for interpreting the digital information received at said digital mobile station and said terminal node in accordance with the last received of said first or said second inband signaling bit pattern to enable the alternate exchange of both speech and data between said digital mobile station and said terminal node over a single communication channel.

39. A system for alternately transmitting speech and data within a cellular radio communication system operating in accordance with the global system for mobile communications (GSM) specifications in which tandem free operation (TFO) is implemented so that the speech decoders and speech encoders within the fixed portion of the network are selectively bypassable so that speech parameters may be passed transparently through the fixed network from one mobile station to another mobile station, said system comprising:

means for connecting a first node, including a digital mobile radio subscriber station, to a second node comprising a service node connected within the network;

means for implementing tandem free operation within the fixed communication network;

means for sending a block of digital information, of about the same size and data rate as speech parameters are sent within said network, between said first and second nodes, said block containing an inband signaling bit pattern which indicates to the receiving node whether the digital information to follow is to be interpreted by that node as speech or data;

means for receiving the sent block of digital information at the receiving node; and means for interpreting the received block of digital information at the receiving node in accordance with the indication contained in the inband signaling bit pattern as either speech or data.

40. A system for alternately transmitting speech and data within a cellular radio communication system as set forth in claim 39 wherein said block of digital information sent between said first and second nodes is of a size which is greater than that of the inband signaling bit pattern which it includes and wherein the digital information following said bit pattern within said same block is interpreted as either speech or data in accordance with the configuration of said pattern.

41. A system for alternately transmitting speech and data within a cellular radio communication system as set forth in claim 39 wherein all successive blocks of digital information sent between said first and second nodes following said block which contains said inband signaling bit pattern are interpreted by the receiving node as either speech or data in accordance with the configuration of said pattern and until another block containing another different inband signaling bit pattern is received by said node.

42. A system for alternately transmitting speech and data within a cellular radio communication system as set forth in claim 39 wherein said block of digital information sent between said first and second nodes is of a size which is greater than that of the inband signaling bit pattern which it includes and wherein said bit pattern also contains an indication of the number of following successive blocks of digital information following said block containing said bit pattern which are to be interpreted as either speech or data in accordance with the configuration of said pattern.

43. A system for alternately transmitting speech and data within a cellular radio communication system as set forth in claim 39 wherein said second node comprising a service node connected within the network is a server running an application for providing a user service to said digital mobile station, for providing a user service to said digital mobile station determines the particular interpretation to be given to the data which follows said second inband signaling bit pattern.

44. A system for alternately sending voice and data within a digital telecommunications system which includes a first node containing both a data sink and a speech sink connected to a network, and in which said first node selectively receives a signal containing either data or speech parameters from said network, said system comprising:

means for providing a second node containing a data source connected to said network for data communication with said first node through said network;

means for providing a third node containing a speech source connected to said network for voice communication with said first node through said network;

means for setting up a communication connection between said first node and both of said second and third nodes through a switch;

means for translating the speech from the speech source of said third node into speech parameters;

means for providing a TX-alternator within said switch to alternately select either said speech parameters from said third node or said data from said second node and send said selected digital information to said first node in discrete blocks;

means for sending a first inband signaling bit pattern within one of said discrete blocks of digital information from said TX-alternator within said switch to said first node indicating that the digital information contained within the remainder of that block and successive blocks of digital information represent speech parameters;

means for sending a second inband signaling bit pattern within a successive one of said discrete blocks of digital information sent from said TX-alternator within said switch to said second node indicating that the digital information contained within the remainder of that block and successive blocks of digital information represent data; and means for interpreting the digital information received at an RX-alternator within said first node in accordance with the last received of said first or said second inband signaling bit pattern to enable the alternate reception of said digital information blocks representing either speech or data at said speech sink or said data sink as appropriate.

45. A system as set forth in claim 44 wherein said speech from said speech source of said third node is initially PCM encoded and then translated into speech parameters within said switch.

46. A system as set forth in claim 44 wherein digital information from said data source within said second node is first stored within a buffer before selection by said TX-alternator.

47. A system as set forth in claim 46 wherein said digital information stored in said buffer includes electronic mail directed to said first node.

48. A system as set forth in claim 47 wherein said electronic mail within said buffer is only delivered to said first node as background data during a time period when said first node is called by or calls said third node through said switch.

49. A system as set forth in claim 44 wherein said first node is connected to said network through a radio air-interface.

50. A system as set forth in claim 44 wherein said second node is a service node within which electronic mail messages are stored.

51. A system for alternately sending speech and data from a first node to a second node within a digital telecommunications system wherein said first node contains a speech source for sending blocks of digital information containing speech parameters to said second node through said network and a data source for sending digital information comprising data to said second node through said network and wherein said second node contains a speech sink for receiving said blocks of digital information containing speech parameters sent from said first node and a data sink for receiving said blocks of digital information comprising data sent from said first node, said system comprising:

means for providing a TX-alternator within said first node and an RX-alternator within said second node;

means for sending from said TX-alternator within said first node to said second node a first inband signaling bit pattern within a block of digital information indicating that the digital information contained within the remainder of that block and each successive block of digital information represent data;

means for sending from said TX-alternator within said first node to said second node a second inband signaling bit pattern within a block of digital information indicating that the digital information contained within the remainder of that block and each successive block of digital information represent speech parameters;

means for receiving successive blocks of digital information at said second node;

means for detecting with said RX-alternator within said second node the presence of either said first inband signaling bit pattern or said second inband signaling bit pattern within said received blocks of information and alternatively interpreting the received blocks of information following the last received one or the other of said inband signaling bit patterns as either data or speech parameters; and means for handing over blocks of information containing speech parameters to said speech sink for processing and blocks of information containing data to said data sink for processing to enable the alternate transmission of both speech and data from said first node to said second node over a single communication channel.

52. A system for alternately sending voice and data within a telecommunications system as set forth in claim 51 wherein said speech source within said first node includes a speech encoder and said speech sink within said second node includes a speech decoder and wherein said system further includes:

means for selectively bypassing said speech encoder and decoder within said first and second nodes to allow discrete blocks of digital information, in the size and data rate of standard speech parameters, to pass transparently through said network from said first node to said second node in accordance with tandem free operation.

* * * * *

UNITED STATES PATENT AND TRADEMARK OFFICE
CERTIFICATE OF CORRECTION

PATENT NO. : 6,295,302 B1  Page 1 of 1
DATED : September 25, 2001
INVENTOR(S) : Hellwig et al.

It is certified that error appears in the above-identified patent and that said Letters Patent is hereby corrected as shown below:

Column 7,
Line 39, replace "fill" with -- full --

Column 22,
Lines 21-24, replace "station, for providing a user service to said digital mobile station determines the particular anticipation to be given to the data which follows said second inband signaling bit pattern." with -- station. --

Signed and Sealed this

Twenty-seventh Day of August, 2002

*Attest:*

*Attesting Officer*

JAMES E. ROGAN
*Director of the United States Patent and Trademark Office*